US010173560B2

(12) United States Patent
Ochs

(10) Patent No.: US 10,173,560 B2
(45) Date of Patent: Jan. 8, 2019

(54) ISOLATION SYSTEM FOR A SEAT

(71) Applicant: Seat King, LLC, Hutchinson, KS (US)

(72) Inventor: Austin Ochs, Hutchinson, KS (US)

(73) Assignee: Seat King, LLC, Hutchinson, KS (US)

( * ) Notice: Subject to any disclaimer, the term of this patent is extended or adjusted under 35 U.S.C. 154(b) by 10 days.

(21) Appl. No.: 15/423,304

(22) Filed: Feb. 2, 2017

(65) Prior Publication Data

US 2018/0215292 A1 Aug. 2, 2018

(51) Int. Cl.
B60N 2/54 (2006.01)
B60N 2/015 (2006.01)
B60N 2/06 (2006.01)

(52) U.S. Cl.
CPC ............ B60N 2/542 (2013.01); B60N 2/015 (2013.01); B60N 2/06 (2013.01)

(58) Field of Classification Search
CPC ........ B60N 2/542; B60N 2/502; B60N 2/015; B60N 2/06
USPC ............................ 267/141.3, 131, 133, 140.3
See application file for complete search history.

(56) References Cited

U.S. PATENT DOCUMENTS

| 2,202,940 | A | * | 6/1940 | Armington | ........... | F16F 1/3713 |
| | | | | | | 267/141.3 |
| 6,042,093 | A | * | 3/2000 | Garelick | ............. | B63B 17/0081 |
| | | | | | | 114/363 |
| 7,967,282 | B2 | * | 6/2011 | Boyd | ..................... | F16F 3/0935 |
| | | | | | | 267/140.13 |
| 8,146,899 | B2 | | 4/2012 | Hiser | | |
| 8,246,020 | B2 | * | 8/2012 | Nakamura | ............. | B60N 2/502 |
| | | | | | | 267/131 |
| 8,955,832 | B1 | * | 2/2015 | Bartel | ..................... | B60N 2/542 |
| | | | | | | 248/634 |
| 9,821,689 | B2 | * | 11/2017 | Busboom | .................. | B60N 2/42 |
| 2005/0279910 | A1 | * | 12/2005 | Huprikar | ................... | F16F 1/37 |
| | | | | | | 248/636 |
| 2009/0184448 | A1 | * | 7/2009 | Hiser | ....................... | B60N 2/38 |
| | | | | | | 267/140.11 |
| 2010/0117275 | A1 | * | 5/2010 | Nakamura | ............. | B60N 2/502 |
| | | | | | | 267/133 |
| 2015/0130251 | A1 | * | 5/2015 | Kondo | ................... | B60N 2/502 |
| | | | | | | 297/451.3 |
| 2015/0136938 | A1 | * | 5/2015 | Kondo | ................... | B60N 2/502 |
| | | | | | | 248/573 |
| 2017/0190270 | A1 | * | 7/2017 | Busboom | ................. | B60N 2/42 |

FOREIGN PATENT DOCUMENTS

DE 102007058207 B3 * 5/2009 ............. B60N 2/015

* cited by examiner

Primary Examiner — Eret C McNichols
(74) Attorney, Agent, or Firm — Hovey Williams LLP

(57) ABSTRACT

The present invention is generally related to isolation systems for various seating configurations. The isolation system may comprise a first set of isolators positioned perpendicular to a second set of isolators. The positioning of the first and second sets of isolators may enable the isolation system to exhibit a radial stiffness of at least 350 lbf/inch. The improved radial stiffness of the isolation system may dampen and attenuate the transfer of energy (e.g., vibrations) to the seat, which may facilitate a smoother ride for an operator sitting in the seat.

20 Claims, 5 Drawing Sheets

ISOLATION SYSTEM FOR A SEAT

BACKGROUND

1. Field of the Invention

The present invention relates generally to isolation systems. More particularly, the present invention generally relates to isolation systems for various seating configurations.

2. Description of the Related Art

During operation of a vehicle, an operator sitting in the seat of the vehicle may experience vibrations, shock, and other energy transferred from various external conditions affecting the vehicle and from internal components, such as the engine. In particular, the operator may experience energy transferred in a number of directions causing discomfort for the operator and making it more difficult to operate the vehicle. Thus, isolation systems have been employed between the vehicle and seat to isolate the seat from these internal and external transfers of energy. Generally, the isolation systems attenuate and dampen the transferred energy through of the use of an isolator.

Although various isolation systems exist in today's market, many of these systems exhibit one or more deficiencies that negatively impact their performance in deterring undesirable energy from reaching the operator. Therefore, there is a need for a more efficient isolation system that is capable of better deterring undesirable energy and forces from reaching the operator.

SUMMARY

One or more embodiments of the present invention generally relates to a seat system. The seat system comprises an isolation system interposed between a first body and a second body. The isolation system comprises at least one isolator and exhibits a radial stiffness of at least 350 lbf/inch.

One or more embodiments of the present invention generally relates to a seat system. The seat system comprises an isolation system and a seat body. The isolation system comprises a first set of isolators positioned perpendicular to a second set of isolators, wherein the first set of isolators and the second set of isolators are attached to the seat body.

One or more embodiments of the present invention generally relates to a method of forming a seat system. The method comprises attaching an isolation system to a seat body. The isolation system comprises a first set of isolators positioned perpendicular to a second set of isolators. In addition, the isolation system exhibits a radial stiffness of at least 350 lbf/inch.

BRIEF DESCRIPTION OF THE FIGURES

Embodiments of the present invention are described herein with reference to the following drawing figures, wherein.

DETAILED DESCRIPTION

The present invention is generally related to an isolation system for a seat. In various embodiments of the present invention, the isolation system comprises a first set of isolators positioned perpendicular to a second set of isolators. The positioning of the first and second sets of isolators may enable the isolation system to exhibit a radial stiffness of at least 350 lbf/inch. The improved radial stiffness of the isolation system may dampen and attenuate the transfer of energy to the seat, which may facilitate a smoother ride for an operator sitting in the seat.

Further details regarding the inventive isolation systems are depicted in FIGS. 1-7, which demonstrate various embodiments of the present invention.

Figure 1:
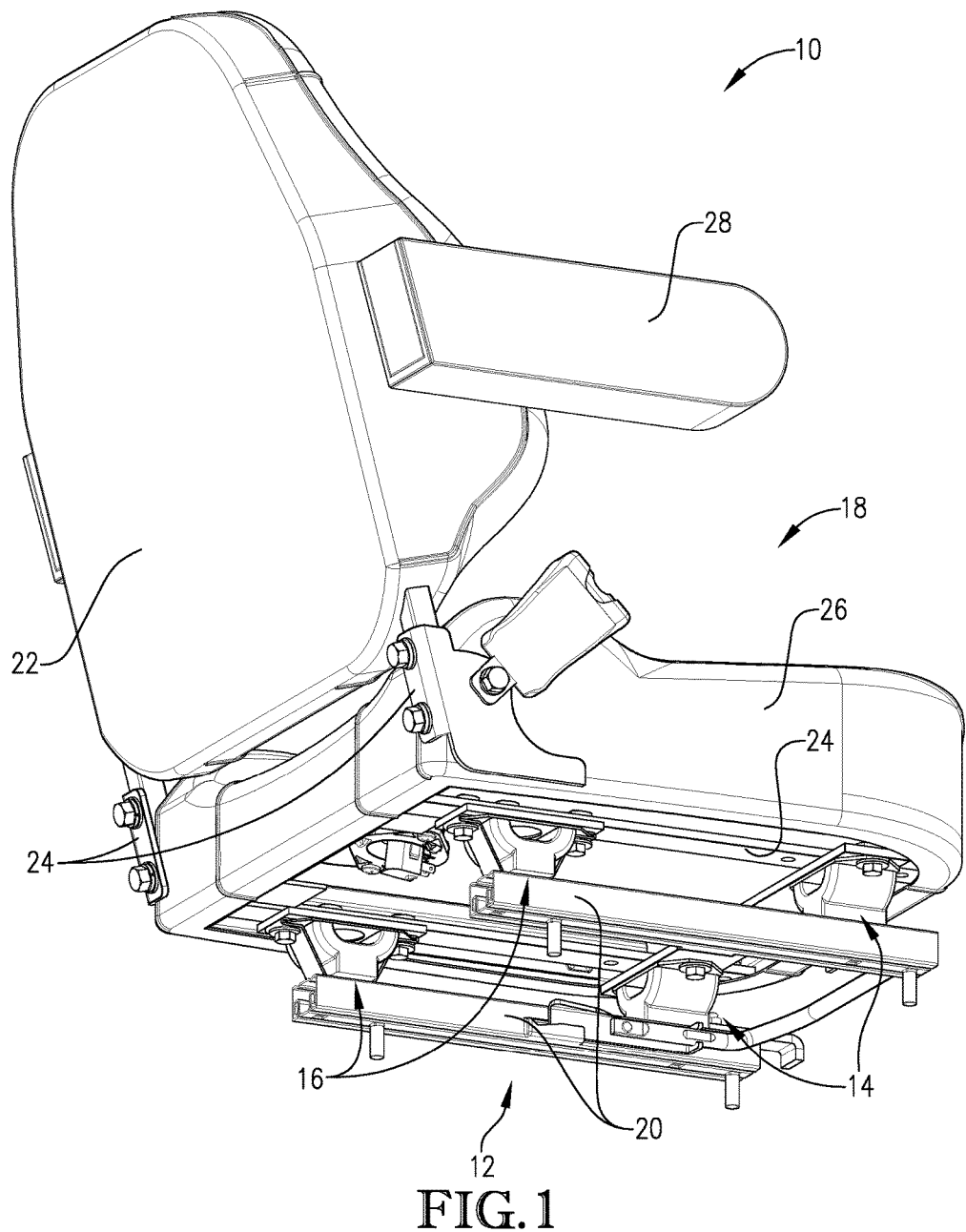
FIG. 1 is a perspective view of the lower rear portion of the seat system in accordance with various embodiments of the present invention.
Figure 2:
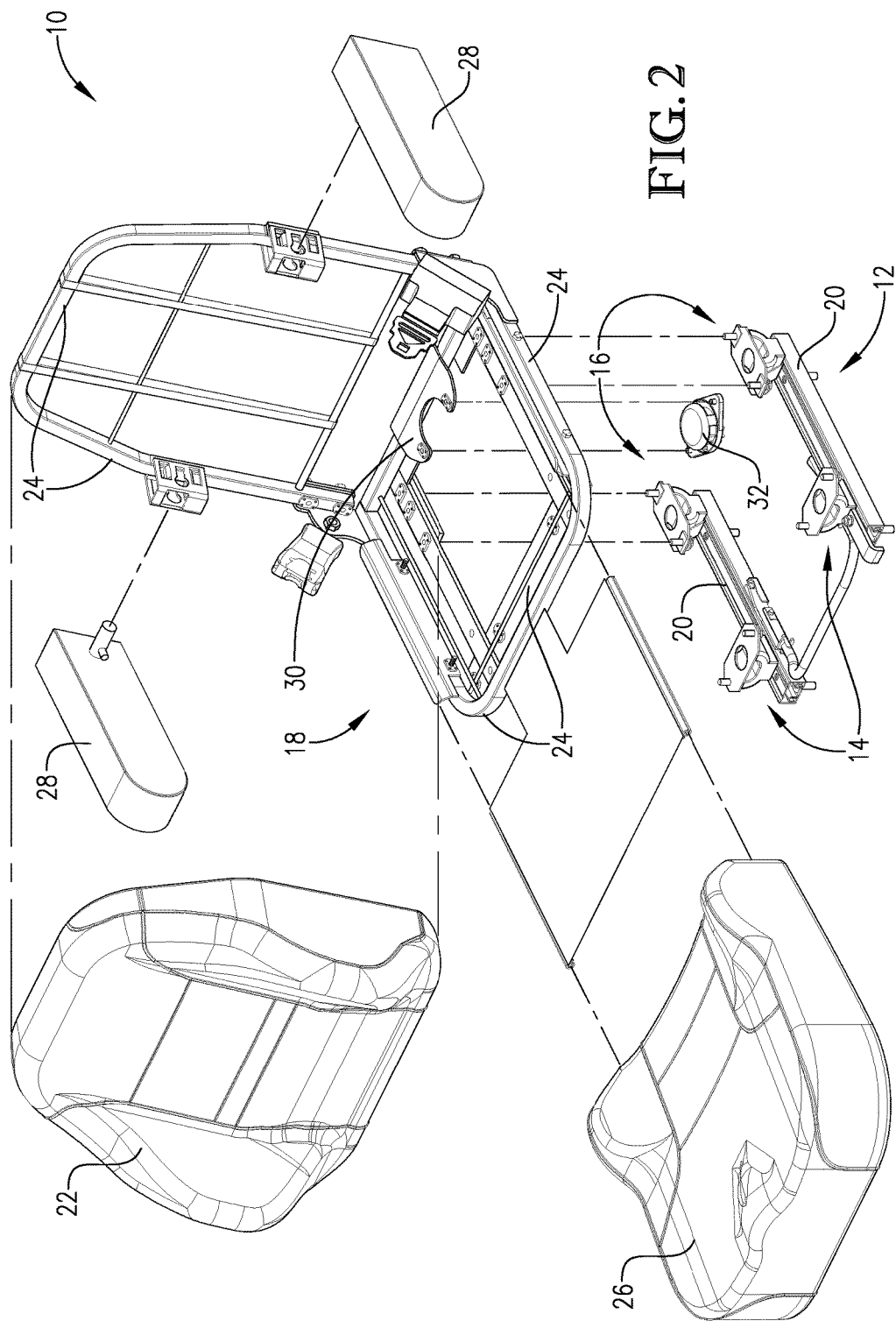
FIG. 2 is an upper perspective assembly view of the seat system in accordance with various embodiments of the present invention.

FIG. 1 depicts a perspective view of the lower rear portion of a seat system 10 comprising an isolation system 12 interposed between a first body and a second body. As shown in FIG. 1, the isolation system 12 comprises a first set of isolators 14 and a second set of isolators 16 that are positioned perpendicularly to one another. Moreover, as depicted in FIG. 1, the first body may be a seat body 18 and the second body may be a seat track 20. Alternatively, in embodiments not depicted in FIG. 1, the second body may comprise the chassis of a vehicle (e.g., a riding lawn mower, a car, a truck, an all-terrain utility vehicle, etc.). It is understood that the isolation system 12 may be mounted directly or indirectly on the chassis of any vehicle, and it may also be attached to various seating configurations, seat frames, and/or seat tracks. The seat 18 may be any conventional seat, but for illustrative purposes, FIGS. 1 and 2 depict the seat 18 having a seat back 22, seat frame 24, seat bottom 26, and arm rests 28. FIG. 2 depicts the isolation system 12 and seat frame 24 in greater detail.

As noted above, the isolation system 12 may be mounted directly on the chassis or it may be mounted on a different attachment surface, such as a seat track 20. In embodiments where a seat track 20 is present in the seat system, the seat track 20 may be mounted directly on the chassis or it may be mounted on an attachment surface of the chassis. As used herein, an "attachment surface of the chassis" refers to an intermediate connection system that is used to connect the chassis to the seat track 20. Such connection systems can comprise a brace, a strap, a bracket, or any other connection systems known in the art. In some embodiments, the chassis may comprise two or less attachment surfaces. In other embodiments, the chassis may comprise a plurality of attachment surfaces. For example, the chassis may comprise at least two, three, or four attachment surfaces.

Turning again to FIG. 1, the isolation system 12 may be mounted on the seat track 20 as shown in FIG. 1. While FIG. 1 shows an isolation system 12 mounted to the bottom of the seat frame 24 and mounted to the top of seat track 20, it is foreseen that the isolation system 12 may be mounted in various configurations involving the seat 18, seat track 20, seat frame 24, chassis of the vehicle, or other seat-related apparatuses. For example, in alternative embodiments not depicted in FIG. 1, the seat track 20 may be mounted to the bottom of seat frame 24 and the isolation system 12 may be mounted to the bottom of the seat track 20.

As used herein, relative terms such as "upper," "lower," "bottom," "fore," "aft," "front," "back," "rear," "forward," "backward," "left," and "right" are from the perspective of an operator sitting in the seat 18 with their back against the seat back 22, unless stated otherwise.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc., relative to the chosen frame of reference.

FIG. 2 depicts an upper perspective assembly view of the seat system 10 comprising an isolation system 12 with a first set of isolators 14 and a second set of isolators 16 slidably or rigidly mounted on the seat tracks 20. As shown in FIG. 2, the seat 18 may comprise the seat back 22, seat frame 24, seat bottom 26, and arm rests 28. The assembly view particularly illustrates how the isolation system 12, seat back 22, seat bottom 26, and arm rests 28 may attach to the seat frame 24. The seat frame 24 may be a single integral frame for the seat back 22 and seat bottom 26, or the seat frame 24 may be separated into individual pieces that may be connected to support the seat back 22 and seat bottom 26. The seat frame 24 may include an operator presence mount 30 for securing and/or receiving an operator presence switch 32. The operator presence switch 32 may be a safety switch that operates to shut down the vehicle and related components, e.g. mower blades, when it detects that an operator is not seated on the seat 18. For example, if an operator driving a lawn mower is ejected from the seat, then the operator presence switch 32 will shut down the lawn mower so that the vehicle and mower blades stop moving.

Figure 3:
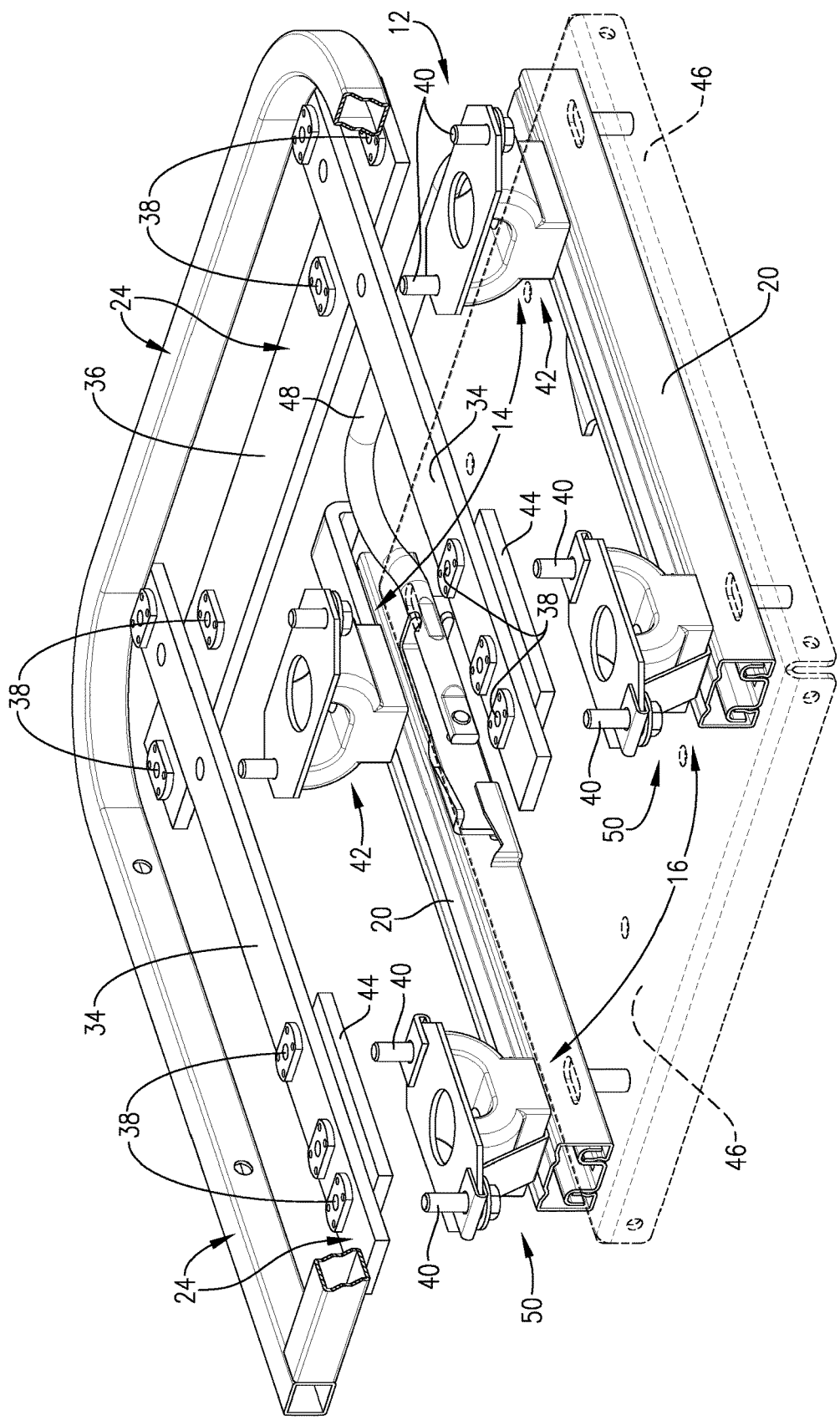
FIG. 3 is an upper perspective assembly view of the seat system with portions of the seat and seat frame broken away for clarity.

FIG. 3 depicts an assembly view of a broken away bottom portion of the seat frame 24 that is illustrated above the isolation system 12 and seat tracks 20. The seat frame 24 may include upper rods 34 extending longitudinally from front to back. The seat frame 24 may also include a lower rod 36 attached perpendicularly at the front end of the upper rods 34. The upper rods 34 and lower rod 36 may each include a plurality of rod fastener receivers 38 for receiving a fastener 40 that may secure an isolator 42 to the seat frame 24. A separator plate 44 may be attached beneath the upper rod 34 and may facilitate the isolators 42 being attached on a parallel plane. The separator plate 44 may include separator plate apertures for receiving the fasteners 40.

The seat track 20 may comprise two parallel rails (e.g., left and right rails) extending longitudinally from front to back. As shown in FIG. 3, the rails of the seat track 20 contain separate connection points whereon the first set of isolators 14 and the second set of isolators 16 may be attached. In particular, the seat track 20 may include a standard mounting pattern for receiving the isolators 42. For example, the standard mounting pattern may include a threaded hole for receiving standard fasteners. Generally, any conventional mounting systems known and utilized in the art may be used to attach the isolators 42 to the seat track 20. In addition, the seat track 20 may attach to the chassis of a vehicle 46 or an attachment surface on the chassis 46 as noted above. In certain embodiments not depicted in FIG. 3, the seat track 20 may be attached directly to the seat frame 24 and be positioned between the seat 18 and the isolation system 12. In various embodiments, the seat track 20 may also comprise a seat position adjustment bar 48 for sliding the seat forward and backward to accommodate operators of varying heights.

In certain embodiments not depicted in FIGS. 1-3, the seat system 10 does not include a seat track 20. In such embodiments, the isolation system may be directly positioned between the seat and the chassis of the vehicle.

Although depicted as containing four isolators 42, the isolation system 12 may include at least two, three, or four isolators. Furthermore, in one or more embodiments, the isolation system 12 may be slidably mounted or rigidly mounted on the seat track 20. For example, the isolation system 12 may include the first set of isolators 14 slidably mounted near the front of seat track 20 and the second set of isolators 16 slidably mounted near the back of seat track 20. The first set of isolators 14 may be mounted to the seat track 20 such that the length of each isolator 42 is parallel to the length of the seat track 20. The second set of isolators 16 may be mounted to the seat track 20 such that the length of each isolator 42 is perpendicular to the length of the seat track 20.

As used herein, "slidably" means that the isolation system 12, first set of isolators 14, second set of isolators 16, and/or isolators 42 are capable of sliding from a first fixed position to a different fixed position while mounted on the seat track 20.

It has been observed that the isolation system 12 can provide a desirable and unique radial stiffness when positioning the first set of isolators 14 and the second set of isolators 16 at a position perpendicular to one another as shown in FIGS. 1-3. As used herein, "radial stiffness" describes the extent to which an isolator or isolation system resists deformation in a generally horizontal direction. In various embodiments, the isolation system 12 may exhibit a radial stiffness of at least 350, 400, 450, 500, 550, 600, or 625 lbf/inch and/or not more than 1,000, 900, 800, or 700 lbf/inch. In such embodiments, each isolator 42 individually may exhibit a radial stiffness of at least 87.5, 100, 112.5, 125, 137.5, 150, or 156.25 lbf/inch and/or not more than 250, 225, 200, or 175 lbf/inch. The radial stiffness is measured according to the ASTM D412—Die C test.

Additionally or alternatively, the isolation system 12 may exhibit an axial stiffness of at least 1,000, 1,100, 1,200, 1,300, or 1,400 lbf/inch and/or not more than 2,000, 1,900, 1,800, or 1,700 lbf/inch. As used herein, the "axial stiffness" describes the extent to which an isolator or isolation system resists deformation in a generally vertical direction. Each isolator 42 may exhibit an axial stiffness of at least 200, 250, 300, or 350 lbf/inch and/or not more than 1,000, 800, 600, or 400 lbf/inch. In various embodiments, the isolation system 12 may exhibit a ratio of vertical stiffness to horizontal stiffness of at least 1:1, 1.5:1, or 2:1 and/or not more than 4:1, 3.5:1, or 3:1. The axial stiffness is measured according to the ASTM D412—Die C test.

In other embodiments, the first set of isolators 14 may be slidably mounted on the left rail of seat track 20 and the second set of isolators 16 may be slidably mounted on the right rail of seat track 20. In yet other embodiments, the first set of isolators 14 may be slidably mounted on the front of the left rail and the back of the right rail, while the second set of isolators 16 may be slidably mounted on the front of the right rail and the back of the left rail. In yet other embodiments, the first set of isolators 14 may be slidably mounted on the front of the right rail and the back of the left rail, while the second set of isolators 16 may be slidably mounted on the front of the left rail and back of the right rail. It should be noted that the various isolator configurations described herein may also apply when mounting the isolation system to the chassis 46 or attachment surface.

The first set of isolators 14 may comprise a first isolator and a second isolator, wherein the first isolator may be spaced at least 5, 10, 15, 20, 25, or 30 cm from the second isolator. Likewise, the second set of isolators 16 may comprise a first isolator and a second isolator, wherein the first isolator may be spaced at least 5, 10, 15, 20, 25, or 30 cm from the second isolator. The first set of isolators 14 and the second set of isolators 16 may be spaced at least 5, 10, 15, 20, 25, 30, 35, or 40 cm apart from each other.

Figure 4:
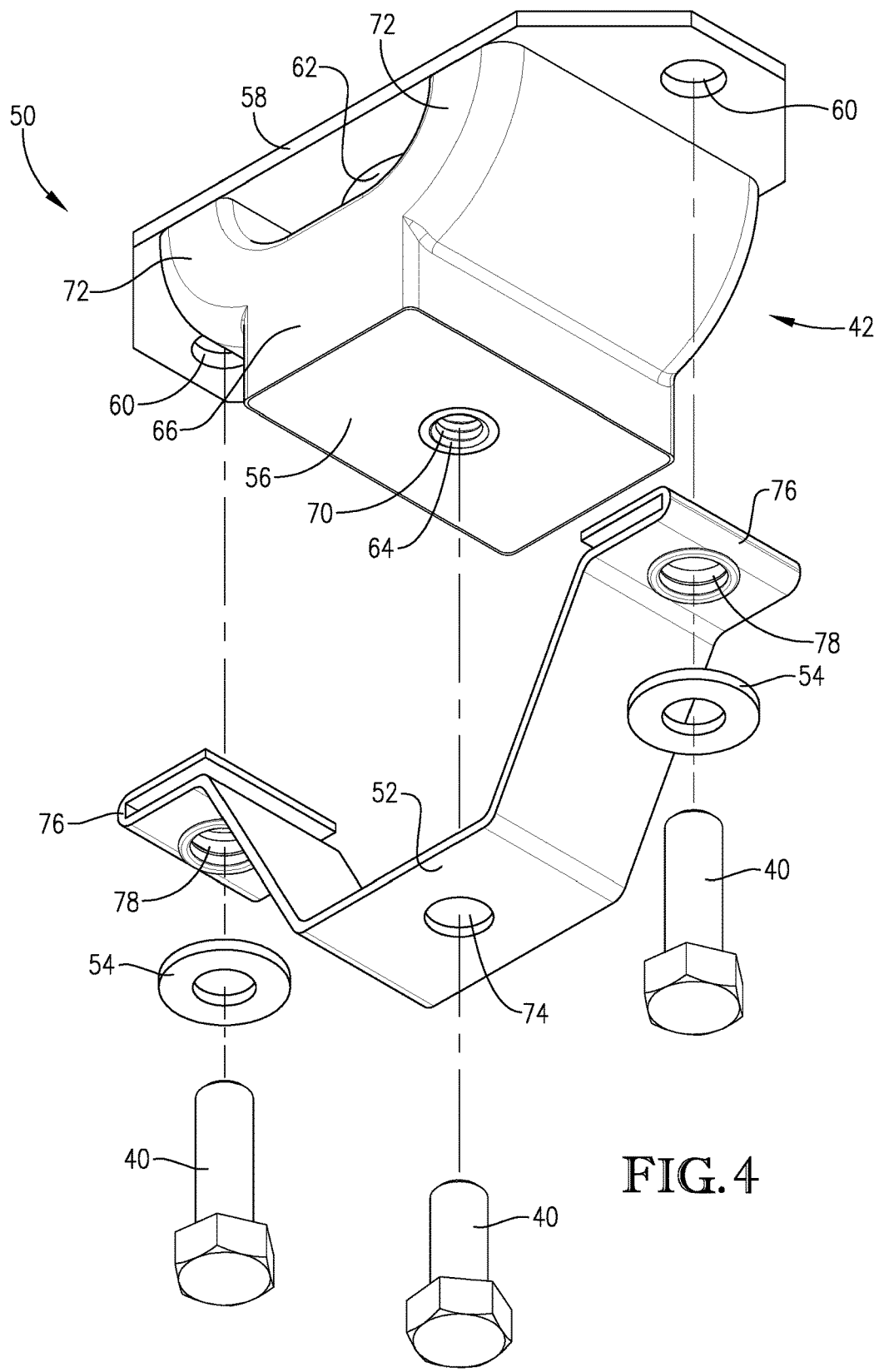
FIG. 4 is a lower isometric assembly view of the isolator assembly in accordance with various embodiments of the present invention.
Figure 5:
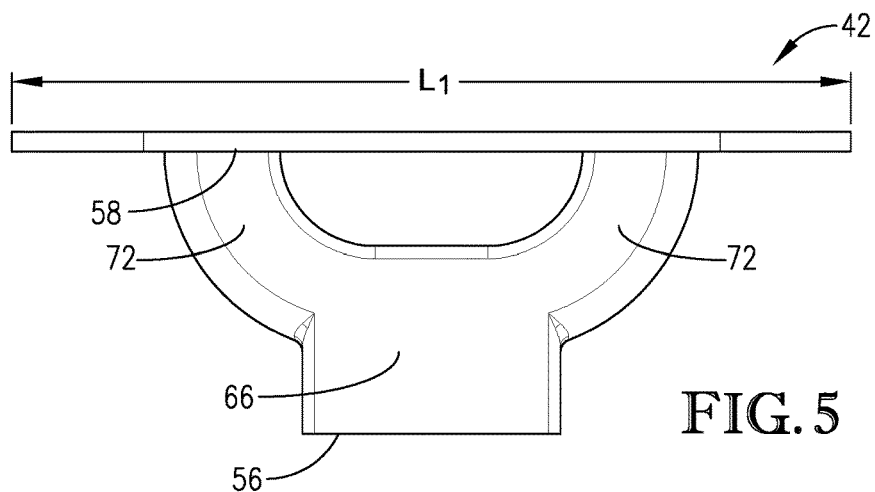
FIG. 5 is a side elevation view of the isolator.
Figure 6:
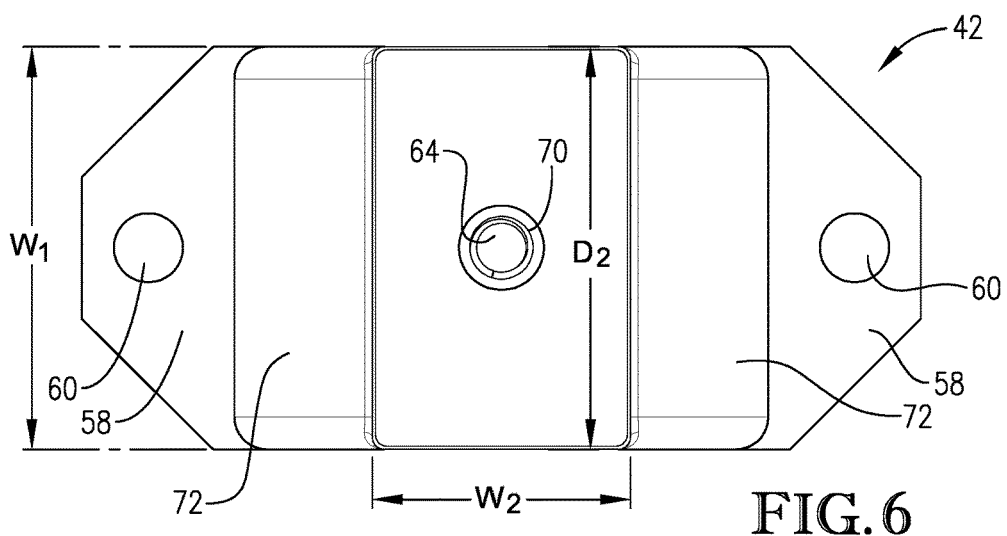
FIG. 6 is a bottom elevation view of the isolator.
Figure 7:
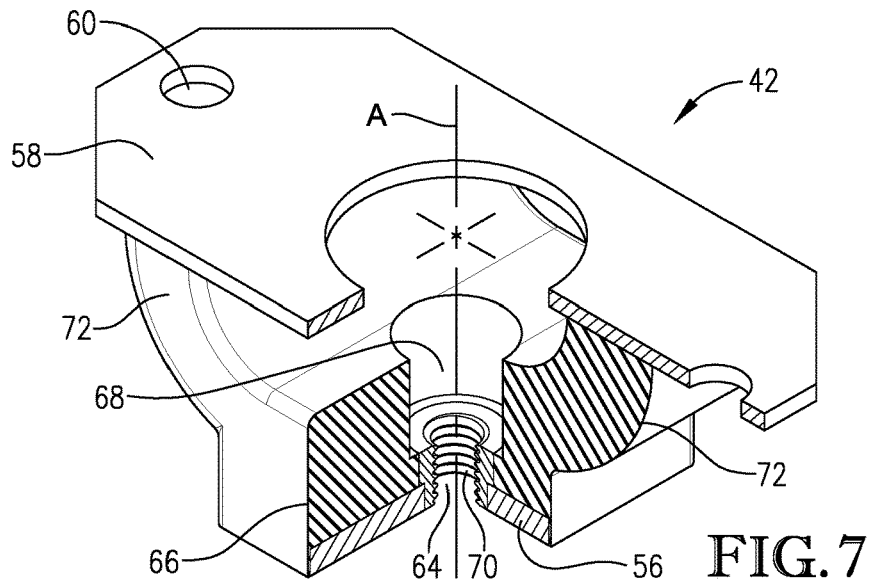
FIG. 7 is an upper isometric view of the isolator with a breakaway for illustrating the composition of the isolator.

Turning again to FIG. 3, the isolators 42 may be mounted as an isolator assembly 50, which is further described below in regard to FIG. 4, or individually as depicted in FIGS. 5-7.

Turning to FIG. 4, an isolator assembly 50 is depicted, which comprises the fasteners 40, the isolator 42, a strap 52, and a washer 54. As depicted in FIG. 4, the isolator 42 may include a lower plate 56 and an upper plate 58. However, in alternative embodiments, it is foreseeable that the isolator 42 may not include the lower plate 56 and/or the upper plate 58. The upper plate 58 may generally be shaped like a thin rectangular cuboid with chamfered corners. Furthermore, in various embodiments, the upper plate 58 may have a plurality of upper plate apertures 60 that may be generally circular in shape, with each aperture 60 configured for receiving the fasteners 40 (e.g., bolts, screws, nuts, etc.). The upper plate 58 may also include a large circular opening 62 positioned near the center point of the upper plate 58. Additionally, in various embodiments, the lower plate 56 may generally be shaped like a thin rectangular cuboid with rounded edges. The lower plate 56 may also include a generally circular lower plate aperture 64 for receiving the fastener 40. A vertical axis of the isolator 42 may be formed from the center point of the lower plate aperture 64 through the center point of the upper plate opening 62.

Additionally, the isolator 42 comprises an isolator body 66 abutting the top of the lower metal plate 56. In various embodiments, the isolator body 66 can be generally shaped like a rectangular cuboid similar to the lower plate 56. The isolator body 66 may extend vertically from the lower plate 56 along the vertical axis of the isolator 42. Furthermore, the isolator body 66 may include a borehole 68 (not depicted in FIG. 4, but shown in FIG. 7) extending through the isolator body 66 along the vertical axis of the isolator 42.

The borehole 68 may include an isolator fastener receiver 70 having a threaded pattern for receiving the fastener 40, such as a screw. The isolator fastener receiver 70 may facilitate the fastener 40 that attaches and/or secures the isolator 42 to the seat body 18 and/or second body. The isolator fastener receiver 70 may comprise a standard mounting pattern for receiving any conventional fastener known and used in the art. The isolator fastener receiver 70 may have a diameter of at least 0.25, 0.5, or 0.75 cm and/or not more than 2, 1.5, or 1.0 cm.

The isolator 42 may include two arcuate-shaped isolator fingers 72 extending vertically towards the upper plate 58. The isolator fingers 72 together may resemble an inverted arch or arcuate-shaped body abutting the bottom surface of the upper metal plate 58. Furthermore, the isolator fingers 72 may extend vertically from the isolator body 66 and attach to the upper plate 58. In various embodiments, one of the isolator fingers 72 may attach to the upper plate 58 between the upper plate opening 62 and one of the upper plate apertures 60, while another isolator finger 72 may attach to the upper plate 58 between the upper plate opening 62 and a different one of the upper plate apertures 60.

The length of the upper plate 58 may be greater than the width of the lower plate 56. In some embodiments, the length of the upper plate 58 may be at least 1, 2, 3, 4, 5, 10, 15, or 20 cm greater than the width of the lower plate 56. In other embodiments, the ratio of the upper plate 58 length to the lower plate 56 width may be 1.2:1, 1.3:1, 1.4:1, 1.5:1, 1.6:1, 1.7:1, 1.8:1, 1.9:1, or 2:1. The length of the upper plate 58 may be shown as L in FIG. 5, and the width of the lower plate 56 may be shown as W2 in FIG. 6.

As noted above, the isolator assembly 50 may include a strap 52. The strap 52 may operate as a failsafe and provide strength to the isolator 42 during a seat belt test. For example, the strap 52 may enable the seat to pass the J2194 test for the lawn and garden industry.

The strap 52 may be a nylon-webbed strap with a strap aperture 74 that allows the fastener 40 to pass through the strap 52. Each end of the strap 52 may have a folded end 76 for wrapping around an edge of the upper metal plate 58, and the folded ends 76 may have a plurality of eyelets 78. For example, each folded end 76 may have two eyelets 78 that are vertically aligned when the strap 52 is folded over to create the folded ends 76. In some embodiments, the eyelets 78 may be metal grommets that strengthen the apertures formed in strap 52. The folded end 76 may strengthen the eyelet/grommet 78 attachment point with the fastener 40 to the isolator 42.

As shown in FIG. 4, the isolator assembly 50 may be assembled by attaching the strap 52 to the isolator 42 by aligning the bottom of the strap 52 with the bottom of the lower plate 56 and folding the strap around edges of the upper plate 58 to create the folded ends 76. The strap 52 may fold around the isolator 42 such that the strap aperture 74 is aligned with the lower plate aperture 64 and the respective eyelets 78 are aligned with the upper plate apertures 60. Once the strap 52 is properly aligned with the isolator 42, the washers 54 may be placed abutting the bottom of the eyelets 78 and then fasteners 40 may be inserted therethrough to secure the isolator assembly 50 to the seat frame 24. The fastener 40 may be inserted through the strap aperture 74 and lower plate aperture 64 to secure the isolator 42 to a second body, such as the seat tracks 20 or chassis (not shown). In other embodiments, the washers 54 and fasteners 40 may be inserted in a similar manner without the strap 52.

FIG. 5 illustrates a side elevation view of the isolator 42 that may have an upper plate 58 length greater than a lower plate 56 width (shown as W2 in FIG. 6). The elevation view also illustrates the isolator 42 comprising the isolator body 66 and the isolator fingers 72. The length of the upper plate 58 may be shown by L1.

FIG. 6 depicts a bottom elevation view of the isolator 42. This view illustrates an embodiment of the isolator 42 comprising the lower plate 56, upper plate 58, upper plate apertures 60, lower plate aperture 64, isolator fastener receiver 70, and isolator fingers 72. The width of upper plate 58 may be shown by W1 and the length and width of lower plate 56 may be shown by D2 and W2, respectively.

FIG. 7 is an isometric view of an embodiment of the isolator 42 with part of the isolator 42 broken away to illustrate its composition. The isolator body 66 and isolator fingers 72 may be composed of an elastomeric material. e.g., an unsaturated rubber. As used herein, an "unsaturated rubber" refers to rubbers or elastomers that have not, but may undergo sulfur vulcanization. Furthermore, the terms "rubber" and "elastomer" may be used interchangeably. The unsaturated rubber may comprise a natural polyisoprene, a synthetic polyisoprene, a polybutadiene rubber, a chloroprene rubber (e.g., neoprene), a butyl rubber, a styrene-butadiene rubber, a nitrile rubber, or combinations thereof. In certain embodiments, the isolator body 66 and the isolator fingers 72 are produced from a chloroprene rubber, such as neoprene.

In various embodiments, the lower plate 56 and the upper plate 58 may be composed of a metal, such as stainless steel. The lower plate 56 may include the lower plate aperture 64 and the upper plate 58 may include the upper plate apertures 60. Similarly, the isolator fastener receiver 70 may be composed of metal, such as stainless steel. In various embodiments, the walls of the borehole 68 may be formed by the same elastomeric composition as the isolator body 66.

It should be noted that all of the numerically-labeled components in FIGS. 1-7 should be consistently labeled and are associated with the same components throughout FIGS. 1-7. Thus, any disclosure related to a component as described in one figure, should be applicable to its depiction in another figure.

Turning back to FIG. 3, a method for attaching the isolation system 12 to the seat frame 24 and seat track 20 will now be described. In various embodiments, the method comprises attaching the isolation system 12 to the seat body 18 and the second body. Generally, this step of attaching may include connecting the first set of isolators 14 and/or the second set of isolators 16 to the second body with the fasteners 40. Additionally or alternatively, the step of attaching may also include connecting the first set of isolators 14 and/or the second set of isolators 16 to the seat body 14 with the fasteners 40.

As depicted in FIG. 3, the isolators 42 may be slidably mounted to the seat track 20. However, in other embodiments, the isolators 42 may be mounted to the seat track 20, chassis 46, or attachment surface of the chassis in a similar manner. The isolator 42 may be placed on the seat track 20 such that lower plate 56 or strap 52 abuts the top of the seat track 20. Once the isolator 42 is in position on the seat track 20, the fastener 40 may secure the isolator 42 to the seat track 20 by being inserted through the top of seat track 20 and through strap 52 (optional) until the fastener 40 is received by the fastener receiver 70. The threaded pattern of the isolator fastener receiver 70 may engage the fastener 40 to secure the attachment between the isolator 42 and seat track 20.

The first set of isolators 14 may attach to the lower rod 36 of the seat frame 24 by aligning the rod fastener receivers 38 of the lower rod 36 with the upper plate apertures 60. The fasteners 40 may be inserted through the upper plate apertures 60 and rod fastener receivers 38 of the lower rod 36 to secure the attachment between the first set isolators 14 and the seat frame 24.

The second set of isolators 16 may attach to the separator plate 44 of the seat frame 24 by aligning the separator plate apertures and the rod fastener receivers 38 of the upper rod 34 with the upper plate apertures 60. The fasteners 40 may be inserted through the upper plate apertures 60, eyelets 78 (optional), separator plate apertures, and rod fastener receivers 38 of the upper rod 34 to secure the attachment between the second set isolators 16 and the seat frame 24.

It is understood that the isolators 42 may be mounted vice-versa or inverted. For example, the lower plate 56 may attach to the seat frame 24, and the upper plate 58 may attach to the seat track 20, chassis 46, and/or attachment surface of the chassis. In some embodiments without metal plates, the isolator 42 may attach such that the isolator fingers 72 attach to the seat track 20, chassis 46, and/or attachment surface of the chassis, and the isolator body 66 attaches to the seat frame 24.

As discussed above, the isolators 42 may experience vibrations, shock, and other energy transferred from various external conditions affecting the vehicle and from internal components, e.g., an engine. In response to receiving this energy, the isolator 42 may elastically deform and deflect to attenuate, dampen, and dissipate the energy. In certain embodiments, the elastomeric rubber may allow the isolators 42 to elastically deform. Additionally, in various embodiments, the arcuate shape of the isolator fingers 72 provides better movement, deflection, and mounting functionality for the isolator 42. Furthermore, by positioning a first set of isolators 14 perpendicular to a second set of isolators 16, the isolator fingers 72 are facing opposite directions and, thus, have different directions of deflection. For example, if all isolators 42 were facing the same direction, then the seat 18 may be very stiff from front to back but loose side to side. Consequently, the perpendicular positioning of the isolators 42 may allow for a more uniform or even deflection of energy in all directions.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A seat system comprising:
   an isolation system interposed between a seat body and a second body;
   wherein said isolation system comprises a first set of isolators and a second set of isolators,
   wherein said isolation system exhibits a radial stiffness of at least 350 lbf/inch,
   wherein said first set of isolators comprises
   (i) a first isolator comprising a first upper plate positioned proximate to said seat body, a first lower plate positioned proximate to said second body, and a first isolator body having two arcuate-shaped isolator fingers extending vertically from said first lower plate towards said first upper plate, and
   (ii) a second isolator comprising a second upper plate positioned proximate to said seat body, a second lower plate positioned proximate to said second body, and a second isolator body having two arcuate-shaped isolator fingers extending vertically from said second lower plate towards said second upper plate, and
   wherein said second set of isolators comprises
   (iii) a third isolator comprising a third upper plate positioned proximate to said seat body, a third lower plate positioned proximate to said second body, and a third isolator body having two arcuate-shaped isolator fingers extending vertically from said third lower plate towards said third upper plate, and
   (iv) a fourth isolator comprising a fourth upper plate positioned proximate to said seat body, a fourth lower plate positioned proximate to said second body, and a fourth isolator body having two arcuate-shaped isolator fingers extending vertically from said fourth lower plate towards said fourth upper plate.

2. The seat system of claim 1, wherein said first set of isolators are positioned so that a first longitudinal length of said first upper plate and a second longitudinal length of said second upper plate are perpendicular to a third longitudinal length of said third upper plate and a fourth longitudinal length of said fourth upper plate.

3. The seat system of claim 1, wherein said second body comprises a chassis of a vehicle.

4. The seat system of claim 1, wherein said second body comprises a seat track.

5. The seat system of claim 1, wherein said first isolator body, said second isolator body, said third isolator body, and said fourth isolator body comprise an elastomeric body, wherein said elastomeric body comprises an unsaturated rubber selected from the group consisting of a natural polyisoprene, a synthetic polyisoprene, a polybutadiene rubber, a chloroprene rubber, a butyl rubber, a styrene-butadiene rubber, a nitrile rubber, and combinations thereof.

6. The seat system of claim 1, wherein said radial stiffness is in the range of 400 to 1,000 lbf/inch.

7. The seat system of claim 1, wherein said first isolator body, said second isolator body, said third isolator body, and said fourth isolator body comprise an arcuate-shaped body.

8. The seat system of claim 1, wherein said isolation system comprises a ratio of vertical stiffness to horizontal stiffness of about 3.5:1 to 1.5:1.

9. A seat system comprising:
   an isolation system; and
   a seat track comprising a first rail and a second rail;
   wherein said isolation system comprises a first set of isolators and a second set of isolators,
   wherein said first set of isolators comprises
   (i) a first isolator comprising a first upper plate having a first longitudinal length, a first lower plate positioned proximate to said seat track, and a first isolator body having two arcuate-shaped isolator fingers extending vertically from said first lower plate towards said first upper plate, and
   (ii) a second isolator comprising a second upper plate having a second longitudinal length, a second lower plate positioned proximate to said seat track, and a second isolator body having two arcuate-shaped isolator fingers extending vertically from said second lower plate towards said second upper plate, and
   wherein said second set of isolators comprises
   (iii) a third isolator comprising a third upper plate having a third longitudinal length, a third lower plate positioned proximate to said seat track, and a third isolator body having two arcuate-shaped isolator fingers extending vertically from said third lower plate towards said third upper plate, and
   (iv) a fourth isolator comprising a fourth upper plate having a fourth longitudinal length, a fourth lower plate positioned proximate to said seat track, and a fourth isolator body having two arcuate-shaped isolator fingers extending vertically from said fourth lower plate towards said fourth upper plate,
   wherein said first isolator and said third isolator are attached to said first rail and said second isolator and said fourth isolator are attached to said second rail, and
   wherein said first set of isolators and said second set of isolators are positioned so that said first longitudinal length of said first upper plate and said second longitudinal length of said second upper plate are perpendicular to said third longitudinal length of said third upper plate and said fourth longitudinal length of said fourth upper plate.

10. The seat system of claim 9, wherein said seat system further comprises a chassis of a vehicle, wherein said isolation system is interposed between said seat track and said chassis of said vehicle.

11. The seat system of claim 9, wherein said seat system further comprises a seat body, wherein said isolation system is interposed between said seat body and said seat track.

12. The seat system of claim 9, wherein said first isolator body, said second isolator body, said third isolator body, and said fourth isolator body comprise an elastomeric body, wherein said elastomeric body comprises an unsaturated rubber selected from the group consisting of a natural polyisoprene, a synthetic poly isoprene, a polybutadiene rubber, a chloroprene rubber, a butyl rubber, a styrene-butadiene rubber, a nitrile rubber, and combinations thereof.

13. The seat system of claim 9, wherein said isolation system exhibits a radial stiffness in the range of 400 to 1,000 lbf/inch.

14. The seat system of claim 9, wherein said first isolator, said second isolator, said third isolator, and said fourth isolator comprise an arcuate-shaped body.

15. The seat system of claim 9, wherein said isolation system comprises a ratio of vertical stiffness to horizontal stiffness of about 3.5:1 to 1.5:1.

16. A method of forming a seat system, said method comprising:
attaching an isolation system to a seat body,
wherein said isolation system comprises a first set of isolators and a second set of isolators,
wherein said isolation system exhibits a radial stiffness of at least 350 lbf/inch,
wherein said first set of isolators comprises
(i) a first isolator comprising a first upper plate having a first longitudinal length, a first lower plate, and a first isolator body having two arcuate-shaped isolator fingers extending vertically from said first lower plate towards said first upper plate, and
(ii) a second isolator comprising a second upper plate having a second longitudinal length, a second lower plate, and a second isolator body having two arcuate-shaped isolator fingers extending vertically from said second lower plate towards said second upper plate, and
wherein said second set of isolators comprises
(iii) a third isolator comprising a third upper plate having a third longitudinal length, a third lower plate, and a third isolator body having two arcuate-shaped isolator fingers extending vertically from said third lower plate towards said third upper plate, and
(iv) a fourth isolator comprising a fourth upper plate having a fourth longitudinal length, a fourth lower plate, and a fourth isolator body having two arcuate-shaped isolator fingers extending vertically from said fourth lower plate towards said fourth upper plate,
wherein said first set of isolators and said second set of isolators are positioned so that said first longitudinal length of said first upper plate and said second longitudinal length of said second upper plate are perpendicular to said third longitudinal length of said third upper plate and said fourth longitudinal length of said fourth upper plate.

17. The method of claim 16, wherein said seat system further comprises a chassis of a vehicle, wherein said isolation system is interposed between said seat body and said chassis of said vehicle.

18. The method of claim 16, wherein said seat system further comprises a seat track, wherein said isolation system is interposed between said seat body and said seat track.

19. The method of claim 16, wherein said first isolator body, said second isolator body, said third isolator body, and said fourth isolator body comprise an elastomeric body, wherein said elastomeric body comprises an unsaturated rubber selected from the group consisting of a natural polyisoprene, a synthetic poly isoprene, a polybutadiene rubber, a chloroprene rubber, a butyl rubber, a styrene-butadiene rubber, a nitrile rubber, and combinations thereof.

20. The method of claim 16, wherein said radial stiffness is in the range of 400 to 1,000 lbf/inch.

* * * * *